(12) United States Patent
Roychoudhury et al.

(10) Patent No.: US 9,199,846 B2
(45) Date of Patent: Dec. 1, 2015

(54) PROCESS AND APPARATUS FOR REFORMING A HIGH SULFUR-CONTAINING LIQUID FUEL

(75) Inventors: Subir Roychoudhury, Madison, CT (US); Christian Junaedi, Cheshire, CT (US); Saurabh Vilekar, Hamden, CT (US); Dennis E. Walsh, Richboro, PA (US)

(73) Assignee: Precision Combustion, Inc., North Haven, CT (US)

( * ) Notice: Subject to any disclaimer, the term of this patent is extended or adjusted under 35 U.S.C. 154(b) by 463 days.

(21) Appl. No.: 13/822,776

(22) PCT Filed: Oct. 3, 2011

(86) PCT No.: PCT/US2011/001698
§ 371 (c)(1),
(2), (4) Date: Mar. 13, 2013

(87) PCT Pub. No.: WO2012/087343
PCT Pub. Date: Jun. 28, 2012

(65) Prior Publication Data
US 2013/0174485 A1    Jul. 11, 2013

Related U.S. Application Data

(60) Provisional application No. 61/404,568, filed on Oct. 5, 2010.

(51) Int. Cl.
*C01B 3/38* (2006.01)
*B01J 8/00* (2006.01)
(Continued)

(52) U.S. Cl.
CPC ............... *C01B 3/382* (2013.01); *B01D 53/48* (2013.01); *C01B 3/386* (2013.01); *C01B 3/48* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,483,693 | A | 11/1984 | White et al. |
| 5,051,241 | A | 9/1991 | Pfefferle |

(Continued)

FOREIGN PATENT DOCUMENTS

| | | |
|---|---|---|
| DE | 102005048385 A1 | 4/2007 |
| WO | WO2004060546 A2 | 7/2004 |

(Continued)

OTHER PUBLICATIONS

Anonymous, "Kerosene—Why is it now Red?", New York State Department of Agriculture and Markets, Mar. 18, 2008; XP 055190121; Retrieved from the internet: url: http://www.agriculture.ny.gov/WM/Kerosene.html.

(Continued)

*Primary Examiner* — Kaity Handal
(74) *Attorney, Agent, or Firm* — Marie F. Zuckerman

(57) ABSTRACT

A reforming process and apparatus exhibiting improved catalyst longevity towards reforming a high sulfur-containing liquid fuel. The process involves contacting in a first reforming zone a first oxidant and a liquid fuel containing high molecular weight organosulfur compounds with a partial oxidation catalyst under CPOX reaction conditions to form a first reformate stream containing a mixture of unconverted and partially-converted hydrocarbons and one or more low molecular weight sulfur compounds; and then contacting in a second reforming zone the first reformate stream with steam and optionally a second oxidant in the presence of an autothermal reforming catalyst under ATR reaction conditions to form a second reformate stream containing carbon monoxide and hydrogen and one or more low molecular weight sulfur compounds. The low molecular weight sulfur compounds can be readily removed from the first and/or second reformate streams by gas phase adsorption methods.

19 Claims, 6 Drawing Sheets

(51) Int. Cl.
*B01D 53/48* (2006.01)
*C01B 3/48* (2006.01)

(52) U.S. Cl.
CPC ... *B01D 2253/108* (2013.01); *B01D 2253/1124* (2013.01); *B01D 2255/20792* (2013.01); *B01D 2256/16* (2013.01); *B01D 2256/20* (2013.01); *B01D 2257/304* (2013.01); *B01D 2257/306* (2013.01); *B01D 2257/308* (2013.01); *C01B 2203/0244* (2013.01); *C01B 2203/0261* (2013.01); *C01B 2203/0283* (2013.01); *C01B 2203/042* (2013.01); *C01B 2203/043* (2013.01); *C01B 2203/0485* (2013.01); *C01B 2203/066* (2013.01); *C01B 2203/1005* (2013.01); *C01B 2203/1023* (2013.01); *C01B 2203/1029* (2013.01); *C01B 2203/1047* (2013.01); *C01B 2203/1064* (2013.01); *C01B 2203/1082* (2013.01); *C01B 2203/1247* (2013.01); *C01B 2203/142* (2013.01)

(56) References Cited

U.S. PATENT DOCUMENTS

| | | | |
|---|---|---|---|
| 5,248,489 | A | 9/1993 | Kidd et al. |
| 6,156,444 | A | 12/2000 | Smith et al. |
| 6,447,745 | B1 * | 9/2002 | Feeley et al. ............... 423/648.1 |
| 6,984,372 | B2 | 1/2006 | Randhava et al. |
| 6,986,797 | B1 * | 1/2006 | Clawson et al. ............. 48/102 A |
| 7,063,732 | B2 | 6/2006 | Katikaneni et al. |
| 2004/0047799 | A1 | 3/2004 | Randhava et al. |
| 2004/0106837 | A1 * | 6/2004 | Lampert et al. ............... 585/820 |
| 2004/0118747 | A1 | 6/2004 | Cutler et al. |
| 2004/0258602 | A1 | 12/2004 | Castaldi et al. |
| 2005/0028445 | A1 | 2/2005 | Roychoudhury et al. |
| 2005/0107482 | A1 * | 5/2005 | Van Egmond et al. ....... 518/726 |
| 2006/0013760 | A1 * | 1/2006 | Shi et al. ................... 423/648.1 |
| 2007/0092766 | A1 | 4/2007 | England et al. |
| 2007/0130830 | A1 | 6/2007 | Varatharajan et al. |
| 2007/0160880 | A1 | 7/2007 | Fischer |
| 2008/0044347 | A1 | 2/2008 | Roychoudhury |
| 2008/0229662 | A1 | 9/2008 | Aicher |
| 2008/0267848 | A1 | 10/2008 | Stephanopoulos et al. |
| 2009/0065400 | A1 | 3/2009 | Song |
| 2009/0151237 | A1 | 6/2009 | Takegoshi et al. |
| 2009/0228146 | A1 | 9/2009 | Roychoudhury |
| 2009/0242458 | A1 | 10/2009 | Soloveichik et al. |
| 2009/0246119 | A1 | 10/2009 | Nicolaos et al. |
| 2009/0252661 | A1 | 10/2009 | Roychoudhury et al. |
| 2009/0293358 | A1 | 12/2009 | Roychoudhury et al. |
| 2009/0317323 | A1 | 12/2009 | Doshi |
| 2010/0047160 | A1 * | 2/2010 | Allam .......................... 423/651 |
| 2010/0181230 | A1 | 7/2010 | Jiang |
| 2011/0061299 | A1 | 3/2011 | Roychoudhury |
| 2012/0090238 | A1 | 4/2012 | Roychoudhury et al. |

FOREIGN PATENT DOCUMENTS

| | | |
|---|---|---|
| WO | WO 2008/025002 A2 | 2/2008 |
| WO | WO2012/041766 A1 | 10/2012 |

OTHER PUBLICATIONS

Subir Roychoudhury, M. Lyubovsky, D. Walsh, D. Chu, and E. Kallio, "Design and development of a diesel and JP-8 logistic fuel processor," Journal of Power Sources, Elsevier SA, CH, vol. 160 (2006), No. 1, pp. 510-513.

Supplementary European Search Report in European Patent application 11850515.5 (national stage of PCT/US2011/001698), European Patent Office, Jun. 2, 2015, 3 pp.

M. Castaldi, M. Lyubovsky, R. LaPierre, W.C. Pfefferle, and S.Roychoudhury, "Performance of Microlith Based Catlytic Reactors for an Isooctane Reforming System," SAE International, publ No. 2003-01-1386, Mar. 3, 2003.

I.C. Lee and H.C. Ubanyionwu, "Determination of Sulfur Contaminants in Military Jet Fuels," Fuel, vol. 87 (2008), pp. 312-318.

L. Bromberg, D.R. Cohn, A. Rabinovich, and N. Alexeev, "Plasma Catalytic Reforming of Methane," International Journal of Hydrogen Energy, vol. 24 (1999), pp. 1131-1137.

J.T. Sampanthar, H. Xiao, J. Dou, T. Yin Nah, X. Rong, W. P. Kwan "A Novel Oxidative Desulfurization Process to Remove Refractory Sulfur Compounds from Diesel Fuel," Applied Catalysis B: Environmental, vol. 63 (2006), pp. 85-93.

Y. Wang, J. Latz, R. Dahl, J. Pasel, and R. Peters, "Liquid Phase Desulfurization of Jet Fuel by a Combined Pervaporation and Adsorption Process," Fuel Processing Technology, vol. 90 (2009), pp. 458-464.

Ligang Lin, Yuzhong Zhang, and Ying Kong, "Recent Advances in Sulfur Removal from Gasoline by Pervaporation," Fuel, vol. 88 (2009), pp. 1799-1809.

S. Roychoudhury, D. Walsh, D. Chu, E. Kallio, "Performance of a Diesel, JP-8 Reformer," Fuel Cell Seminar, Honolulu, Hawaii, Nov. 13-17, 2006, pp. 1-4.

G. Alptekin, A Jayaraman, M. Dubovik, M. Schaefer, J. Monroe, and K. Bradley, "Desulfurization of Logistic Fuels for Fuel Cell APU's," 26th Army Science Conference, Orlando, FL, Dec. 1-4, 2008.

M, Namazian, S. Sethuraman, G. Venkataraman, Altex Technologies Corporation, "Fuel Preprocessor (FPP) for a Solid Oxide Fuel Cell Auxiliary Power Units," Final Report, DOE Grant DE-FG36-02GO12058, Dec. 2004.

\* cited by examiner

PROCESS AND APPARATUS FOR REFORMING A HIGH SULFUR-CONTAINING LIQUID FUEL

GOVERNMENT RIGHTS

This invention was made with support from the U.S. government, Department of Defense, under Contract No. W56HZV-09-C-0515. The U.S. government holds certain rights in this invention.

CROSS-REFERENCE TO RELATED APPLICATIONS

This application is a 371 filing of International Patent Application no. PCT/US2011/001698, filed Oct. 3, 2011, which claims the benefit of U.S. provisional patent application Ser. No. 61/404,568, filed Oct. 5, 2010.

FIELD OF THE INVENTION

In one aspect, this invention pertains to a process of reforming a liquid fuel containing a high concentration of sulfur (hereinafter referred to as a "high sulfur-containing liquid fuel" or simply "high sulfur-containing fuel"). Preferably, this invention pertains to reforming a high sulfur-containing liquid fuel to produce an essentially sulfur-free gaseous reformate suitable for use in fuel cell applications. For the purposes of this invention, the terms "high sulfur-containing liquid fuel" and "high sulfur-containing fuel" refer to any fuel comprising one or more liquid hydrocarbons and greater than about 100 parts per million by weight (100 $ppm_w$) sulfur, as described hereinafter.

In another aspect, this invention pertains to an efficient and compact fuel processor system for reforming a high sulfur-containing fuel, as would be particularly useful in logistic or field operations.

BACKGROUND OF THE INVENTION

Up to the present time, deployment of fuel cells in field operations and military applications has been inhibited, due to an inability to use widely-available logistic fuels as a primary energy source. The term "logistic fuel" refers to any fuel that is approved by the U.S. government as acceptable for logistic maneuvers or field operations. Logistic fuels typically comprise a high concentration of sulfur. A preferred logistic fuel is a high sulfur-containing jet propulsion fuel, particularly JP-8 fuel, wherein the sulfur content specification ranges up to about 3,000 $ppm_w$. Typically, the sulfur is present in the form of high molecular weight organosulfur compounds as identified, for example, by I. C. Lee and H. C. Ubanyionwu, in "Determination of Sulfur Contaminants in Military Jet Fuels," Fuel, 87 (2008), pp. 312-318.

Reforming catalysts are severely affected by high sulfur-containing fuels, resulting in lower catalyst performance and endurance as evidenced by lower fuel conversion, reduced hydrogen output, lower thermal efficiency, and a higher concentration of coke precursors, as compared with sulfur-free fuels. For the purposes of this invention, a "coke precursor" is defined as an organic compound that tends under reaction conditions to form carbonaceous or graphitic deposits. Coke precursors include, for example, C2 compounds, such as ethane and ethylene, and C3 compounds, such as propane and propylene. A low quality reformate stream with an unacceptable concentration of coke precursors leads to carbon formation and increased pressure drop, and thus a failure of downstream fuel cell stacks. Moreover, at sulfur concentrations on the order of 3,000 $ppm_w$ as found in preferred logistic fuels, such as JP-8, the reforming catalyst tends to lose activity to an unacceptable level. Operating a fuel reformer at an elevated temperature may compensate for reduced catalytic activity; however, a higher temperature may hasten catalyst degradation.

To be suitable for use in fuel cell applications, high sulfur-containing fuels must be reformed in the presence of a reforming catalyst into a clean gaseous reformate, which preferably comprises a mixture of hydrogen and carbon monoxide essentially free of sulfur. As used herein, the terms "essentially free of sulfur" and "essentially sulfur-free" refer to a sulfur concentration of less than about 10 parts per million by volume (10 $ppm_v$), preferably, less than about 5 $ppm_v$, and more preferably, less than about 1 $ppm_v$. Different approaches have been used to achieve acceptable fuel reforming starting from a high-sulfur containing fuel. Examples of five such approaches include: (a) plasma reforming, (b) oxidative desulfurization, (c) hydrodesulfurization, (d) pervaporation, and (e) liquid fuel desulfurizer sorption.

In the case of plasma reforming wherein no catalyst is used to assist in the reforming, the process is known to be sulfur tolerant. The main disadvantages, however, include an unacceptably large apparatus size, an unacceptably high parasitic power input, and unacceptably high electrode erosion at elevated pressures thus reducing longevity. As a reference, see L. Bromberg, D. R. Cohn, A. Rabinovich, and N. Alexeev, "Plasma Catalytic Reforming of Methane," International Journal of Hydrogen Energy, 24 (1999), pp. 1131-1137.

As described for example in WO-A2-2008/025002 and disclosed by J. T. Sampanthar, et al. in "A Novel Oxidative Desulfurization Process to Remove Refractory Sulfur Compounds from Diesel Fuel," Applied Catalysis B: Environmental 63 (2006), pp. 85-93, oxidative desulfurization may be effective in converting recalcitrant thiophenes and other refractory sulfur compounds into more tolerable polar sulfoxides, polar sulfones and other polar oxidation products; however, the process also has several disadvantages. Downstream multi-stage cleanup (extraction or adsorption) is needed to remove the polar sulfoxides or sulfones, followed by waste management of such extracted sulfur compounds. Moreover, employing an oxidant, such as hydrogen peroxide or pure oxygen, poses safety risks in portable or field operations. The overall system is expensive as well as bulky and, therefore, unacceptable for logistic operations. Moreover, the operational cost of an oxidative desulfurization system increases with increasing sulfur content in the fuel, due to stoichiometric or higher consumption of required oxidant relative to sulfur.

Hydrodesulfurization (HDS), as disclosed for example in U.S. Pat. No. 6,984,372B2, while being mature for large scale operations and acceptably efficient in removing thiols, sulfides, and disulfides, is far less effective for removing thiophenes, common species of which include dibenzothiophene and its alkylated derivatives. These compounds, especially 4-methyldibenzothiophene and 4,6-dimethyldibenzothiophene, render deep desulfurization by HDS unacceptably difficult. Moreover, catalytic activity towards removing alkylated dibenzothiophenes is further decreased in the presence of inhibitors like aromatics and organic nitrogen species, which are ubiquitous in fuels. Additionally, HDS requires a hydrogen feed, which implies a complex and large system.

The pervaporation approach, as described for example by Y. Wang, J. Latz, R. Dahl, J. Pasel, and R. Peters in "Liquid phase desulfurization of jet fuel by a combined pervaporation and adsorption process," Fuel Processing Technology, 90 (2009), pp. 458-464, requires a permeation membrane to separate selectively the organosulfur compounds from the hydrocarbon compounds prior to reforming. Another disclosure is found by Ligang Lin, Yuzhong Zhang, and Ying Kong, in "Recent Advances in Sulfur Removal from Gasoline by Pervaporation," Fuel, 88 (2009), pp. 1799-1809. The system, which takes a multi-stage approach, also involves challenges in handling the separated fuel fraction (typically 30%) containing the organosulfur compounds. Moreover, a low flux is achieved that makes the system bulky; and an energy intensive and expensive refrigeration system is generally required to condense light hydrocarbons at high vacuum. Finally, increasing aromatics, alkenes, and sulfur content in the feed may lead to increased flux and decreased organosulfur separation.

Liquid fuel desulfurization involving a sorbent-based adsorption unit may provide an improved methodology for developing integrated fuel processors that can operate with up to 3500 $ppm_w$ sulfur-containing fuels to produce fuel cell quality reformate. Efforts are being made to develop new adsorbents to remove thiophenic compounds from logistic fuels either via n-complexation, van der Waals and electrostatic interactions, or via reactive adsorption by chemisorption at elevated temperatures. Despite considerable efforts put into regenerable liquid fuel desulfurization via adsorption or fuel fractionation/organosulfur compound adsorption, the best approaches have resulted in systems of considerable size and complexity due to their low sulfur sorption capacity. Also, the process removes disadvantageously about 5 percent or more, by weight, of the fuel and has associated parasitic losses for equipment operation (e.g., high pressure drop across the sorbent bed) due to problems associated with organosulfur adsorption. Many commercially available sorbents have unacceptably low sulfur adsorption capacity, low adsorption duration (i.e., fast breakthrough time), and high liquid fuel retention. Moreover, regeneration of the sorbent bed requires good thermal management in order to avoid temperature excursions and hot spots that can rapidly deactivate the sorbent materials. As an example of liquid fuel desulfurization, see U.S. Pat. No. 7,063,732B2, US 2007/0092766A1, and US 2004/0118747A1.

In summary, none of the approaches discussed hereinabove is sufficiently simple, compact, economical, and versatile to allow for reforming of a wide range of high sulfur-containing liquid fuels over an acceptable period of operation. Thus, the clean reformate that is needed as a primary source of energy, especially as may be required in logistics and field operations and in advanced fuel cell stacks, remains far from reach.

SUMMARY OF THE INVENTION

In one aspect, this invention provides for an integrated process of reforming a high sulfur-containing liquid fuel comprising:

(a) feeding a high sulfur-containing liquid fuel feedstock comprising one or more liquid hydrocarbons and one or more high molecular weight organosulfur compounds into a first reforming zone, and contacting therein said fuel with a first oxidant in the presence of a partial oxidation catalyst under partial oxidation reaction conditions sufficient to produce a first reformate stream comprising a mixture of partially-converted hydrocarbons, unconverted hydrocarbons, and one or more low molecular weight sulfur compounds; and (b) feeding the first reformate stream from step (a) into a second reforming zone and contacting therein said first reformate stream with steam and, optionally, a second oxidant in the presence of an autothermal reforming catalyst under autothermal reforming reaction conditions sufficient to produce a second reformate stream comprising carbon monoxide, hydrogen, and one or more low molecular weight sulfur compounds.

In a second aspect, this invention provides an apparatus for reforming a high sulfur-containing liquid fuel comprising:

(a) a first reforming zone; a first inlet for feeding a high sulfur-containing liquid fuel into said first reforming zone; a second inlet for feeding a first oxidant into said first reforming zone; a partial oxidation catalyst located within said first reforming zone in fluid communication with said first and second inlets; and a first outlet in fluid communication with said partial oxidation catalyst for exiting a first reformate stream from said first reforming zone; and (b) a second reforming zone positioned downstream of said first reforming zone; a third inlet in fluid communication with the first outlet from said first reforming zone for feeding the first reformate stream into said second reforming zone; a fourth inlet for optionally feeding a second oxidant into said second reforming zone; a fifth inlet for feeding steam into said second reforming zone; an autothermal reforming catalyst positioned within said second reforming zone in fluid communication with said third, fourth, and fifth inlets; and a second outlet positioned in fluid communication with said autothermal reforming catalyst for exiting a second reformate stream from said second reforming zone.

In one preferred embodiment of the apparatus, the first and second reforming zones are located within one housing.

In another preferred embodiment of the apparatus, the first and second reforming zones are located in two separate housings, the second housing being sequentially connected to the first housing.

In a third aspect, this invention provides for an integrated process of reforming a high sulfur-containing liquid fuel comprising:

(a) feeding a high sulfur-containing liquid fuel feedstock comprising one or more liquid hydrocarbons and greater than about 100 $ppm_w$ sulfur into a first reforming zone, and contacting therein said fuel with a first oxidant in the presence of a partial oxidation catalyst under partial oxidation reaction conditions sufficient to produce a first reformate stream comprising a mixture of partially-converted hydrocarbons and unconverted hydrocarbons; and (b) feeding the first reformate stream from step (a) into a second reforming zone and contacting therein said first reformate stream with steam and, optionally, a second oxidant in the presence of an autothermal reforming catalyst under autothermal reforming reaction conditions sufficient to produce a second reformate stream comprising carbon monoxide and hydrogen;

the overall process operating at a hydrocarbon conversion of greater than about 95 mole percent to C1 products for a time period greater than about 100 hours.

The inventions described hereinabove advantageously permit reforming of a high sulfur-containing fuel, containing greater than about 100 $ppm_w$ sulfur and preferably less than about 3,500 $ppm_w$ sulfur, with substantially complete fuel conversion, low coke precursor formation, and when using the preferred catalyst substrate, a rapid response time. Advantageously, sulfur containing fuels at the lower end of the range from about 100 $ppm_w$ to about 500 $ppm_w$ may also be efficiently reformed, thus avoiding the need for separate apparatuses, as is done presently, for handling different fuels at higher and lower ends of the sulfur content range. These characteristics make the reactor and process of this invention well suited for portable and logistics applications, preferably, for integration with deployable fuel cell power generators. Advantageously, the apparatus and process of this invention may also be employed with high sulfur-containing feedstocks other than logistic fuels, for example, biofuels, as well as in industrial applications consisting of reformation of high sulfur feedstocks.

In the first reforming zone of the process and apparatus, high molecular weight organosulfur compounds in the liquid hydrocarbon fuel are converted, all or in part, to low molecular weight sulfur compounds, preferably hydrogen sulfide ($H_2S$) and carbonyl sulfide (COS) and other less refractory sulfur compounds, via a catalytic partial oxidation process, referred to hereinafter as "Stage 1: CPOX," or simply "CPOX." In this first reforming zone, reaction conditions are employed that preferably maintain low to moderate conversion of the hydrocarbon fuel to C1 products (i.e., CO, $CO_2$, and $CH_4$). The bulk of the fuel reformation to form a gaseous reformate (second reformate) comprising carbon monoxide and hydrogen is achieved, preferably, in the second reforming zone, which can tolerate high concentrations of low molecular weight sulfur compounds in the inlet gas mixture. Moreover, any unconverted high molecular weight organosulfur compounds remaining in the reformate exiting the first reforming zone are desirably converted fully to low molecular weight sulfur compounds in the second reforming zone. Accordingly, the reformate effluent from the first reforming zone is fed to the inlet of the second reforming zone, wherein steam and optionally a second oxidant are added to foster reaction, maintain operation under autothermal conditions, and reduce propensity toward coke formation. "Autothermal reforming," hereinafter given the acronym "ATR" or "Stage 2: ATR," refers to self-sustaining steady state operation, i.e., no external energy input (e.g., heat) is needed at steady state operation. The low molecular weight sulfur compounds that are formed in the first and/or second reforming zones can be removed from the respective reformate stream, as desired, via gas-phase adsorption, described in detail hereinafter. Owing to a low water content of the reformate streams, the thermodynamics of adsorption favor a high uptake of sulfur by the adsorbent.

Advantageously, the present invention avoids bulky and complex liquid fuel desulfurization and cleanup processes upstream of the reforming reactor, thereby beneficially reducing system volume, complexity, and cost. More to the point, prior art processes typically employ a guard bed upstream of the reforming reactor for removing sulfur from the fuel. Alternatively, the guard bed is often incorporated into the housing at the upstream end of the reforming catalyst, thereby oversizing the reforming zone. At the point that the guard bed becomes saturated with sulfur, the bed must be replaced or regenerated. The present invention advantageously eliminates the need for the upstream sulfur clean-up system, thereby reducing system volume and complexity.

Preferably, the process of the invention operates with air as the first oxidant and the optional second oxidant, thereby advantageously avoiding safety issues associated with handling pure oxygen or hydrogen peroxide. The invention also provides advantageously for improved sulfur tolerance during fuel reforming, essentially complete fuel conversion, low coke precursor formation, and good response time characteristics, while maintaining high overall reforming efficiency and catalyst longevity. The process and reformer apparatus of this invention, for example, are capable of operating for greater than about 30 hours, preferably greater than about 100 hours, more preferably greater than about 250 hours, and most preferably, greater than about 1,000 hours with high sulfur-containing liquid fuels with essentially complete fuel conversion with minimum coke precursors. As another advantage, the process provides for removing sulfur from a gaseous reformate stream. This approach is herein defined as Catalytic Reductive De-Sulfurization (CRDS).

DRAWINGS

DETAILED DESCRIPTION OF THE INVENTION

Figure 1:
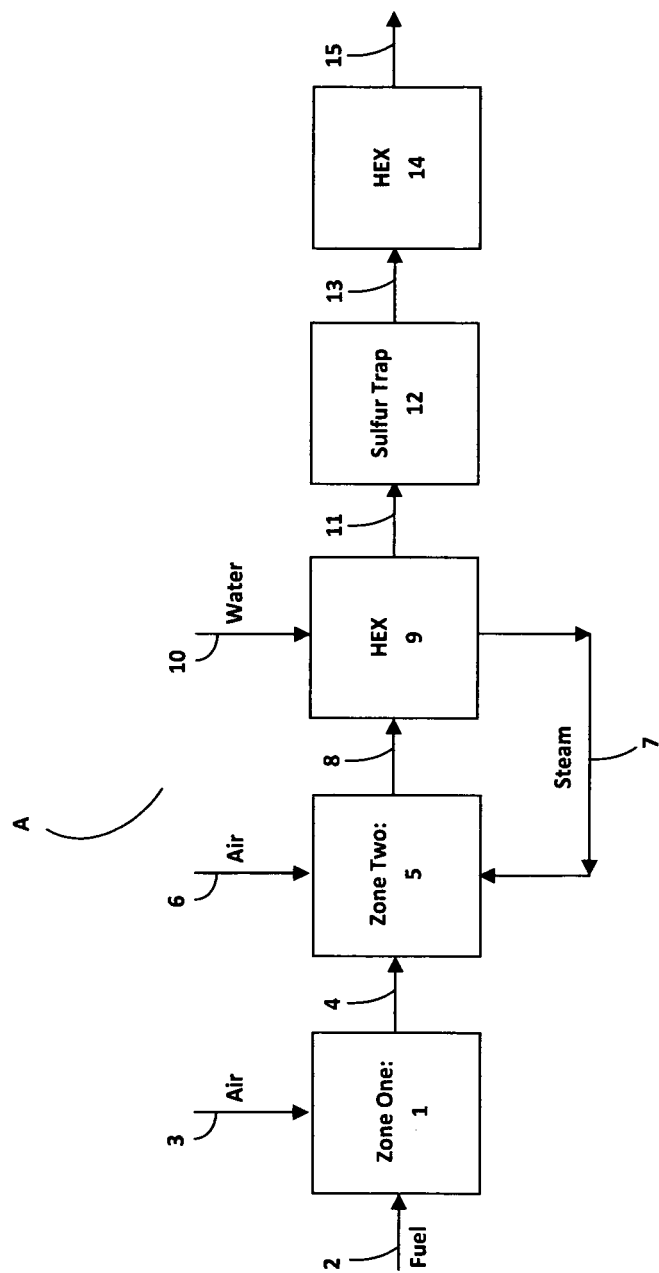
FIG. 1 depicts a flow chart representing a preferred embodiment of the apparatus and process of this invention.

The following definitions are provided herein to clarify the scope of the invention.

For the purposes of this invention, the term "hydrocarbon(s)" shall broadly refer to any organic compound or compounds consisting essentially of carbon and hydrogen, and optionally, nitrogen, oxygen, or a combination of nitrogen and oxygen. The term does not include compounds containing sulfur. If sulfur is present in a combination with carbon and hydrogen, the compound is specifically referenced herein as an "organosulfur compound" or a "sulfur-containing compound."

The term "liquid hydrocarbon" shall refer to a hydrocarbon that is a liquid at ambient temperature and pressure, taken as 22° C. and 1 atmosphere (101 kPa).

The term "unconverted hydrocarbon" refers to a hydrocarbon compound that is unreacted in the reforming process, thereby exiting the reforming zone in the same form in which it entered the reforming zone.

The term "partially-converted hydrocarbon" refers to a hydrocarbon compound that is a product of reforming a hydrocarbon fuel. Preferably, the partially-converted hydrocarbon comprises a molecule or chemically-bonded compound comprising carbon and hydrogen, and optionally oxygen. For purposes of clarity, the term "partially-converted hydrocarbon" does not include carbon monoxide, carbon dioxide, methane, or water. In contrast, the second reformate exiting the process of this invention comprises fully converted products including C1 products, specifically, carbon monoxide, carbon dioxide, and methane, and as coproducts hydrogen and water.

The term "coke precursor(s)" refers to a hydrocarbon compound or compounds, preferably containing two (C2) or three (C3) carbon atoms, which under reforming conditions produce carbon deposits. Typical coke precursors include ethane, ethylene, propane, and propylene. The term "low" as it modifies "coke precursors" refers to a total concentration of less than about 2,000 ppm$_v$, preferably, less than about 1,000 ppm$_v$, and more preferably, less than about 100 ppm$_v$ coke precursors in a reformate stream.

The term "high sulfur-containing fuel" or "high sulfur-containing liquid fuel" shall refer to any fuel comprising one or more liquid hydrocarbons and sulfur in a concentration greater than about 100 parts per million by weight (100 ppm$_w$), preferably, greater than about 500 ppm$_w$. As a preferred upper limit, the liquid hydrocarbon fuel comprises less than about 3,500 ppm$_w$ of sulfur.

The term "organosulfur compound" or "organic sulfur compound" shall refer to any compound comprising carbon, hydrogen, and sulfur, suitable examples of which include without limitation organosulfides, organodisulfides, thiophenes, thiols, and mercaptans as known in the art.

For the purposes of this invention, the term "high molecular weight organosulfur compound(s)" shall define a generic organosulfur compound or compounds that occur naturally in the liquid hydrocarbon fuel fed to the process of this invention. Such naturally-occurring or "native" organosulfur compounds may also be considered to be fuel-bound or hydrocarbon-bound. Suitable non-limiting examples of such high molecular weight organosulfur compounds include thiols, disulfides, thiophenes, and derivatives thereof. Preferably, the high molecular weight organosulfur compound has a molecular weight equal to or greater than 80 grams per mole ($\geq$80 g/mol), preferably, greater than 90 g/mol.

The term "inorganic sulfur compound" shall refer to any compound comprising sulfur and any other element of the Periodic Table of the Elements, preferably carbon, oxygen, and hydrogen, but exclusive of the combination of carbon and hydrogen. Suitable examples of inorganic sulfur compounds include hydrogen sulfide ($H_2S$), carbonyl sulfide (COS), and carbon disulfide ($CS_2$).

The generic term "sulfur compound" or "sulfur-containing compound" shall refer to any inorganic or organic compound comprising sulfur. The term "low molecular weight sulfur compound(s)" shall define a generic sulfur compound or compounds that is/are non-native to the hydrocarbon fuel fed to the process of this invention. These compounds typically have lower molecular weight and correspondingly lower boiling point, as compared to the native high molecular weight organosulfur compounds found in the fuel. Suitable examples of such low molecular weight sulfur compounds include, without limitation, hydrogen sulfide ($H_2S$) and carbonyl sulfide (COS). Preferably, the low molecular weight sulfur compound comprises an organic or inorganic sulfur-containing compound having a molecular weight less than 80 g/mol (<80 g/mol).

The phrase "essentially free of sulfur" shall refer to a reformate stream having a sulfur concentration of less than about 10 parts per million by volume (ppm$_v$), preferably, less than about 5 ppm$_v$, and more preferably less than about 1 ppm$_v$.

In a first preferred aspect, this invention provides a process of reforming a high sulfur-containing liquid fuel comprising:

(a) feeding a high sulfur-containing liquid fuel feedstock comprising one or more liquid hydrocarbons and one or more high molecular weight organosulfur compounds into a first reforming zone, and contacting therein said fuel with a first oxidant in the presence of a partial oxidation catalyst under partial oxidation reaction conditions sufficient to produce a first reformate stream comprising a mixture of partially-converted hydrocarbons, unconverted hydrocarbons, and one or more low molecular weight sulfur compounds;

(b) feeding the first reformate stream from step (a) into a second reforming zone and contacting therein said first reformate stream with steam and, optionally, with a second oxidant in the presence of an autothermal reforming catalyst under autothermal reforming reaction conditions sufficient to produce a second reformate stream comprising carbon monoxide, hydrogen, and one or more low molecular weight sulfur compounds; and (c) contacting the second reformate stream from step (b) with a sulfur adsorbent bed under conditions sufficient to produce a desulfurized second reformate stream comprising carbon monoxide and hydrogen and being essentially free of sulfur.

In a related preferred aspect, this invention provides an apparatus for reforming a high sulfur-containing liquid fuel comprising:

(a) a first reforming zone; a first inlet for feeding a high sulfur-containing liquid fuel into said first reforming zone; a second inlet for feeding a first oxidant into said first reforming zone; a partial oxidation catalyst located within said first reforming zone in fluid communication with said first and second inlets; and a first outlet in fluid communication with said partial oxidation catalyst for exiting a first reformate stream from said first reforming zone; and (b) a second reforming zone positioned downstream of said first reforming zone; a third inlet in fluid communication with the first outlet from said first reforming zone for feeding the first reformate stream into said second reforming zone; a fourth inlet for feeding an optional second oxidant into said second reforming zone; a fifth inlet for feeding steam into said second reforming zone; an autothermal reforming catalyst positioned within said second reforming zone in fluid communication with said third, fourth, and fifth inlets; and a second outlet positioned in fluid communication with said autothermal reforming catalyst for exiting a second reformate stream from said second reforming zone; and (c) a sulfur adsorbent bed positioned downstream from said second reforming zone, and having an inlet in fluid communication with the second outlet of the second reforming zone, and having an outlet for exiting a desulfurized second reformate stream.

In a second preferred aspect, this invention provides a process of reforming a high sulfur-containing liquid fuel, comprising:

a) feeding a high sulfur-containing liquid fuel feedstock comprising one or more liquid hydrocarbons and one or more high molecular weight organosulfur compounds into a first reforming zone, and contacting therein said fuel with a first oxidant in the presence of a partial oxidation catalyst under partial oxidation reaction conditions sufficient to produce a first reformate stream comprising a mixture of partially-converted hydrocarbons, unconverted hydrocarbons, one or more unconverted high molecular weight organosulfur compounds, and one or more low molecular weight sulfur compounds;

(b) contacting the first reformate stream from step (a) with a first sulfur adsorbent bed under conditions sufficient to produce a partially-desulfurized first reformate stream comprising a mixture of partially-converted hydrocarbons and unconverted hydrocarbons, and one or more unconverted high molecular weight organosulfur compounds; and (c) feeding the partially-desulfurized first reformate stream from step (b) into a second reforming zone and contacting therein said partially-desulfurized first reformate stream with steam and, optionally, a second oxidant in the presence of an autothermal reforming catalyst under autothermal reforming reaction conditions sufficient to produce a second reformate stream comprising carbon monoxide and hydrogen and one or more low molecular weight sulfur compounds; and (d) contacting the second reformate stream from step (c) with a second sulfur adsorbent bed under conditions sufficient to produce a desulfurized second reformate stream comprising a mixture of carbon monoxide and hydrogen and being essentially free of sulfur.

In a related preferred aspect, this invention provides an apparatus for reforming a high sulfur-containing liquid fuel comprising:

(a) a first reforming zone; a first inlet for feeding a high sulfur-containing liquid fuel into said first reforming zone; a second inlet for feeding a first oxidant into said first reforming zone; a partial oxidation catalyst located within said first reforming zone in fluid communication with said first and second inlets; and a first outlet in fluid communication with said partial oxidation catalyst for exiting a first reformate stream from said first reforming zone;

(b) a first sulfur adsorbent bed positioned downstream from said first reforming zone, and having an inlet in fluid communication with the first outlet of the first reforming zone, and having an outlet for exiting a partially-desulfurized first reformate stream;

(c) a second reforming zone positioned downstream of said first sulfur adsorbent bed; a third inlet in fluid communication with the outlet from said first sulfur adsorbent bed for feeding the partially-desulfurized first reformate stream into said second reforming zone; a fourth inlet for feeding an optional second oxidant into said second reforming zone; a fifth inlet for feeding steam into said second reforming zone; an autothermal reforming catalyst positioned within said second reforming zone in fluid communication with said third, fourth, and fifth inlets; and a second outlet positioned in fluid communication with said autothermal reforming catalyst for exiting a second reformate stream from said second reforming zone; and (d) a second sulfur adsorbent bed positioned downstream from said second reforming zone, and having an inlet in fluid communication with the second outlet of the second reforming zone, and having an outlet for exiting a desulfurized second reformate stream.

In a first stage of the two-stage reforming process of this invention, a fuel feedstock comprising one or more liquid hydrocarbons and one or more high molecular weight organosulfur compounds is converted in a first reforming zone via a catalytic partial oxidation process (CPOX) into a first reformate stream comprising a mixture of unconverted and partially-converted hydrocarbons, one or more low molecular weight sulfur compounds, such as hydrogen sulfide ($H_2S$), carbonyl sulfide (COS), and other less refractory sulfur compounds, and optionally comprising carbon monoxide and hydrogen. The CPOX reforming step is conducted preferably in absence of co-fed water, although water may be fed if desired. The process is also conducted under reaction conditions sufficient to convert preferably greater than 10 percent of the high molecular weight organosulfur compounds into low molecular weight sulfur compounds. Accordingly, the first reformate stream may optionally comprise unconverted high molecular weight organosulfur compounds. In another preferred embodiment, the CPOX step is preferably conducted at high gas hourly space velocity ($\geq 20,000$ hr$^{-1}$). In this first stage (i.e., selective sulfur reformation), hydrocarbon fuel conversion to C1 products (i.e., CO, $CO_2$, and $CH_4$) is preferably maintained at a low to moderate level, preferably, less than about 50 mole percent. Complete fuel reformation is achieved in a second reforming zone in stage two of the process, which can tolerate high concentrations of low molecular weight sulfur compounds in the inlet gas mixture, if they have not already been removed by adsorption. Additionally, any unconverted high molecular weight organosulfur compounds can be reacted in the second reforming zone to low molecular weight sulfur compounds. Steam and, optionally, a second oxidant are fed with the reformate effluent from the first zone to the second zone to maintain operation under autothermal reforming conditions (ATR) and to reduce propensity towards formation of coke precursors.

The low molecular weight sulfur compounds that are formed in this two-stage reforming process can be removed via gas-phase adsorption, by contacting the first reformate from the Stage 1: CPOX zone and/or the second reformate from the Stage 2: ATR zone with a sulfur adsorbent. In contrast to the prior art, liquid phase sulfur cleanup upstream of the reforming reactor is avoided. Gas phase sulfur clean-up, as described in this invention, is more readily and economically effected as compared to sulfur clean-up of liquid fuels. Thus, the invention results in a reduction in system volume and complexity, while achieving a low concentration of coke precursors and essentially complete fuel conversion, which results are otherwise not achievable when operating with high sulfur-containing liquid fuels.

A schematic diagram of a preferred embodiment (A) of the process of this invention is depicted in FIG. 1. A fuel feedstock comprising one or more hydrocarbons and one or more high molecular weight organosulfur compounds is fed via inlet line 2 into a first reforming zone 1 (Stage 1: CPOX). A first oxidant is also fed via inlet line 3 into first reforming zone 1. The mixture of fuel and first oxidant is contacted with a catalytic oxidation catalyst (not shown) in reforming zone 1 under catalytic partial oxidation reaction conditions sufficient to produce a first reformate stream exiting reforming zone 1 via outlet line 4 and comprising a mixture of unconverted hydrocarbons and partially-converted hydrocarbons, one or more low molecular weight organosulfur compounds, preferably, hydrogen sulfide ($H_2S$) and carbonyl sulfide (COS), and optionally, carbon monoxide and hydrogen and high molecular weight organosulfur compounds. The first reformate stream typically also comprises carbon dioxide, steam, and nitrogen, the carbon dioxide and steam arising from the deep oxidation of a small portion of the hydrocarbons and the nitrogen arising from use of the preferred oxidant, air. At this stage, preferably 10 mole percent or more of the high molecular weight organosulfur compounds are converted to low molecular weight sulfur compounds; whereas conversion of the hydrocarbons is kept at a low to moderate level (e.g., less than about 50 percent). Thereafter, the first reformate stream in line 4 is fed into a second reforming zone 5 (Stage 2: ATR). A second oxidant may optionally be fed via inlet line 6 to second reforming zone 5; and steam is fed via inlet line 7 to second reforming zone 5. The combined mixture of first reformate stream, steam, and optional second oxidant is contacted with an autothermal reforming catalyst (not shown) under autothermal reforming reaction conditions sufficient to produce the second reformate stream comprising carbon monoxide, hydrogen, steam, one or more low molecular weight sulfur compounds, and typically also carbon dioxide, which exits second reforming zone 5 via outlet line 8. The second reformate stream via outlet line 8 is fed into a first heat exchanger 9 (HEX 9) to transfer heat of reaction to inlet water, which is fed into heat exchanger 9 via water feed line 10. The heat transferred converts liquid water into steam, which can be fed as the steam source via feed line 7 into the second reforming zone 5. Second reformate stream comprising carbon monoxide, hydrogen, and low molecular weight sulfur compounds exits the heat exchanger 9 via outlet line 11 and thereafter is fed into sulfur adsorbent bed 12, where low molecular weight sulfur compounds are removed. A desulfurized second reformate stream exiting sulfur adsorbent bed 12 via outlet line 13 comprises carbon monoxide and hydrogen and is essentially free of sulfur. Optionally, the desulfurized second reformate stream in line 13 may be fed to a second heat exchanger 14 (HEX 14) to increase its temperature prior to being fed into a plurality of fuel cell stacks (not shown) via line 15.

The primary feedstock supplied to the process of this invention comprises any high sulfur-containing fuel, more particularly, a high sulfur content liquid hydrocarbon fuel obtainable, for example, from a petroleum or biofuel source. The term "high sulfur-containing" or "high sulfur content" refers to a fuel having a sulfur concentration of greater than about 100 $ppm_w$, preferably, greater than about 500 $ppm_w$. Preferably, the fuel has a sulfur concentration less than about 3,500 $ppm_w$. The fuel itself is a liquid at about 22° C. and 1 atmosphere pressure; and preferably, has a normal boiling point in a range from about 200° C. to about 400° C. The fuel comprises a mixture of paraffinic, cycloaliphatic, and aromatic hydrocarbons, and a mixture of organosulfur compounds of individual molecular weight equal to or greater than 80 g/mol, preferably, equal to or greater than about 90 g/mol. Suitable fuels include, for example, high sulfur content diesel, kerosene, biofuels, and jet propulsion fuels, such as JP-8, JP-5, and Jet A, as well as similar logistic fuels. The preferred high sulfur-containing fuel is selected from the group consisting of diesel, kerosene, jet propulsion fuels, and biofuels, more preferably, jet propulsion fuels, most preferably, JP-8 fuel.

The first oxidant employed in the first reforming zone comprises any oxidant capable of reforming the high molecular weight organosulfur compound(s) into one or more low molecular weight sulfur compounds, preferably, of molecular weight less than 80 g/mol. Suitable first oxidants include without limitation air, essentially pure oxygen, oxygen-enriched nitrogen, and oxygen-enriched inert gases, such as oxygen-enriched helium and argon, where the term "oxygen-enriched" refers to a concentration of oxygen greater than about 20 mole percent up to about 99 mole percent. Preferably, the first oxidant is air.

The first reforming zone is conducted preferably as a dry catalytic partial oxidation process (dry CPOX), i.e., preferably in the absence of co-fed water or steam. Steam might increase the conversion of hydrocarbons; and at this stage conversion of hydrocarbons is kept relatively low in favor of reforming the high molecular weight organosulfur compounds. Unless explicitly stated, however, water is not excluded from the first reforming zone; and in certain circumstances may be beneficial in limited quantity. Generally, therefore, the steam to carbon (St/C) mole ratio, given as the moles of steam fed to the first reforming zone relative to moles of carbon in the fuel feedstock, can range from 0 to less than about 1.0/1. If steam is employed, it can be introduced with the flow of first oxidant, or alternatively, fed through a separate inlet into the first reforming zone.

Any partial oxidation catalyst can be employed in the first reforming zone, provided that such catalyst is capable of oxidizing the high molecular weight organosulfur compounds to low molecular weight sulfur compounds. Conversion of the high molecular weight organosulfur compounds is preferably greater than 10 mole percent, more preferably greater than about 20 mole percent, or higher. Preferably, the partial oxidation catalyst comprises an ultra-short-channel-length metal substrate having deposited thereon one or more catalytic metals, preferably, one or more noble metals. The metal substrate is preferably selected from iron-chromium alloys, or iron-chromium-aluminum alloys, or iron-chromium-nickel alloys. The noble metals include ruthenium, rhodium, palladium, osmium, iridium, platinum, silver, and gold, and mixtures thereof. The catalyst is preferably employed in a mesh or foam form; but the catalyst is not limited to such structures, and other structures may be suitable.

In a most preferred embodiment, the catalyst comprises a Microlith® brand ultra-short-channel-length metal mesh substrate having deposited thereon one or more noble metals, preferably rhodium or a mixture of rhodium and one or more other noble metals; the catalyst being commercially available from Precision Combustion, Inc., located in North Haven, Conn., USA. Microlith® brand ultra-short-channel-length metal mesh substrate technology, described for example in U.S. Pat. No. 5,051,241, and incorporated herein by reference, is a unique catalyst design comprising ultra-short-channel-length, low thermal mass metal monoliths that contrast with prior art monoliths having longer channel lengths. For the purposes of this invention, the term "ultra-short-channel-length" refers to channel lengths in a range from about 25 microns (μm) (0.001 inch) to about 500 μm (0.02 inch). In contrast, the term "long channels" pertaining to prior art monoliths refers to channel lengths greater than about 5 mm (0.20 inch). Preferably, the ultra-short-channel-length substrate has a cell density ranging from about 100 to about 1,000 cells or flow paths per square centimeter. A method of making the ultra-short-channel-length metal mesh substrate is disclosed in U.S. Pat. No. 6,156,444, incorporated herein by reference. The preferred metal mesh may be provided in the form of one or more linearly stacked metal mesh sheets allowing for axial flow from inlet to outlet through the reforming zone. Alternatively, the metal mesh may be provided in the form of a wound coil allowing for axial flow into a tubular center of the coil and radial flow from an inlet at the inner diameter of the coil to an exit at the outer diameter of the coil.

As compared with prior art monolithic catalysts, the preferred Microlith® brand ultra-short-channel-length metal mesh substrate facilitates packing more active surface area into a smaller volume and provides increased reactive area for a given pressure drop. Whereas in prior art honeycomb monoliths having conventional long channels, a fully developed boundary layer is present over a considerable length of the channels; in contrast, the ultra-short-channel-length characteristic of the preferred substrate of this invention avoids boundary layer buildup. Since heat and mass transfer coefficients depend on boundary layer thickness, avoiding boundary layer buildup enhances transport properties. The advantages of employing the ultra-short-channel-length metal substrate, and preferably, the Microlith™ brand thereof, to control and limit the development of a boundary layer of a fluid passing there through is described in U.S. patent application Ser. No. 10/832,055, now issued as U.S. Pat. No. 7,504,047, which is a Continuation-In-Part of U.S. Pat. No. 6,746,657 to Castaldi, both incorporated in their entirety herein by reference.

In the Stage 1: CPOX zone of this process invention, the high sulfur-containing fuel and first oxidant are contacted with the partial oxidation catalyst under any catalytic partial oxidation reaction conditions sufficient to convert preferably greater than 10 percent, more preferably greater than about 20 percent, even more preferably greater than about 30 percent, and most preferably greater than about 85 percent of the high molecular weight organosulfur compounds to low molecular weight sulfur compounds. Advantageously, oxidation of the non-sulfur-containing hydrocarbons is maintained as low as possible, preferably, at greater than 10 mole percent but less than about 50 mole percent. Process conditions to achieve these goals are noted. A reaction temperature advantageously greater than about 800° C., and preferably, greater than about 850° C. is employed. A reaction temperature advantageously less than about 1,200° C., and preferably, less than about 1,000° C. is employed. The reactor pressure is advantageously maintained in a range from about 14.7 psia (101 kPa) to about 100 psia (690). Other pressures, however, can be operable and equally suitable. A successful outcome in the first reforming zone particularly depends upon the use of a high space velocity of the combined inlet feed of fuel and first oxidant. Advantageously, the gas hourly space velocity of the combined fuel and first oxidant feeds is equal to or greater than about 20,000 liters of combined feeds per liter catalyst bed per hour ($\geq 20,000$ hr$^{-1}$), preferably, greater than about 100,000 hr$^{-1}$, measured at ambient temperature and pressure, taken for these purposes as 21° C. and 1 atm (101 kPa). The space velocity is advantageously less than about 10,000,000 hr$^{-1}$, preferably, less than about 1,500,000 hr$^{-1}$, measured at 21° C. and 1 atm (101 kPa).

The quantity of first oxidant relative to quantity of fuel fed to the first reforming zone is best described by an O/C ratio, wherein "O" represents the moles of atomic oxygen present in the first oxidant and "C" represents the moles of carbon present in the liquid fuel fed to the first reforming zone. The O/C ratio selected for use depends upon the concentration of sulfur in the fuel and the operating temperature. As a general guideline, the higher the sulfur concentration in the fuel, the more oxygen may be needed, that is, the higher the O/C ratio. Since sulfur can poison the catalyst, additional oxygen may be needed to maintain the desired reaction temperature. Preferably, an O/C ratio between about 0.60/1 and about 1.60/1 is employed.

The first reformate stream taken from the first reforming zone comprises a gaseous mixture of unconverted and partially-converted hydrocarbons and one or more low molecular weight sulfur compounds, preferably, hydrogen sulfide and carbonyl sulfide. Carbon monoxide and hydrogen are also present to the extent that such conversion of hydrocarbons occurs. Carbon dioxide and steam may be present from the deep oxidation of a portion of the hydrocarbons. Nitrogen is also present, if the first oxidant employed is air. Additionally, unconverted high molecular weight organosulfur compounds may be present in the first reformate stream. The sulfur concentration in the first reformate stream depends upon the concentration of sulfur in the liquid fuel feedstock and the extent of sulfur conversion.

The first reformate stream is fed with steam and, optionally, a second oxidant into the second reforming zone (Stage 2: ATR) of this process invention. If used, the second oxidant comprises any oxidant capable of reforming the unconverted and partially-converted hydrocarbons present in the first reformate stream into a gaseous fuel mixture comprising carbon monoxide and hydrogen. In addition, any unconverted high molecular weight organosulfur compounds can be converted into low molecular weight sulfur compounds. Suitable second oxidants include without limitation air, essentially pure oxygen, oxygen-enriched nitrogen, oxygen-enriched inert gases, such as helium and argon, identical to those mentioned in respect of the first oxidant. The second oxidant is not required to be identical to the first oxidant. Preferably, however, the second oxidant is also air.

The autothermal reforming catalyst used in the second reforming zone may be any reforming catalyst capable of providing the desired gaseous product. Preferably, the autothermal reforming catalyst comprises an ultra-short-channel-length metal substrate having deposited thereon one or more noble metals, similar to that described hereinbefore in reference to the partial oxidation catalyst. More preferably, the autothermal reforming catalyst is provided as a Microlith™ brand ultra-short-channel-length metal substrate in mesh or foam form having one or more noble metals deposited thereon, preferably rhodium or a mixture of rhodium with one or more other noble metals; said catalyst as noted being commercially available from Precision Combustion, Inc., of North Haven, Conn., USA. As noted hereinbefore, preferred forms of the substrate include a metal mesh provided as one sheet or a stack of metal sheets allowing for axial flow from inlet to outlet of the reforming zone, or alternatively, a metal mesh provided as a wound coil allowing for axial flow into the tubular center of the coil and radial flow from an inlet at the inner diameter of the coil to an exit at the outer diameter of the coil.

The Stage 2: ATR zone is advantageously operated at a temperature greater than about 800° C., and preferably, greater than about 900° C. The Stage 2: ATR zone is advantageously operated at a temperature less than about 1,200° C., and preferably, less than about 1000° C. The second stage reactor pressure is maintained advantageously in a range from about 14.7 psia (101 kPa) to about 100 psia (690). The second stage gas hourly space velocity advantageously ranges from greater than about 10,000 liters of combined feeds of first reformate, steam, and optional second oxidant per liter of catalyst bed per hour (10,000 hr$^{-1}$), preferably, greater than about 20,000 hr$^{-1}$, up to less than about 250,000 hr$^{-1}$.

In the second reforming zone, quantity of steam employed is best described in terms of a "St/C ratio," wherein "St" refers to moles of steam fed to the second reforming zone and "C" refers to moles of carbon in the liquid fuel feedstock. For Stage 2: ATR, advantageously, the St/C ratio ranges from about 0.50/1 to about 2.0/1. The second oxidant is optional; therefore, the preferred O/C ratio ranges from about 0/1 to about 1.60/1, wherein "O/C" for these purposes is the ratio of the moles of atomic oxygen in the second oxidant fed to the second stage relative to the moles of carbon in the liquid fuel feedstock. The O/C and St/C ratios employed depend upon the desired operating temperature of the ATR stage. For example, if the operating temperature of the ATR stage is to be increased, it may be advantageous to increase the O/C and/or St/C ratios. The ratios selected will also depend upon how much heat is integrated into the Stage 2: ATR zone from the Stage 1: CPOX zone. Since the CPOX reaction is exothermic, the heat produced can be carried into the ATR thereby lowering the demand for second oxidant.

The second reformate stream, which is discharged from the ATR stage, comprises carbon monoxide, hydrogen, and one or more low molecular weight sulfur compounds. Optionally, the second effluent stream contains carbon dioxide, and typically low concentrations of steam, unconverted or partially-converted hydrocarbons, and optionally coke precursors. Preferably, the second reformate stream contains little or essentially no unconverted or partially-converted hydrocarbons, which means that the hydrocarbons in the liquid fuel feedstock are converted to C1 products to an extent greater than about 90 mole percent, preferably, greater than about 95 mole percent, more preferably, greater than about 99 mole percent, and most preferably, essentially 100 mole percent. Coke precursors, such as C2 and C3 compounds, are found at concentrations less than about 1,000 ppm$_v$ each, for a total of C2 and C3 coke precursors of less than about 2,000 ppm$_v$, preferably, a total less than about 1,000 ppm$_v$, and more preferably, a total less than about 100 ppm$_v$. Steam may be present at a concentration of less than about 30 volume percent. Again, the concentration of low molecular weight sulfur compounds in the second reformate stream will depend upon the concentration of sulfur in the liquid fuel feedstock. Typically, the low molecular weight sulfur compounds may comprise from greater than about 10 ppm$_v$ to less than about 350 ppm$_v$ of the second reformate stream corresponding to an inlet sulfur concentration in the liquid fuel ranging from greater than about 100 ppm$_w$ to less than about 3,500 ppm$_w$. While these numbers do not represent a reduction in sulfur content, the sulfur is now preferably embedded in low molecular weight sulfur-containing compounds, preferably, of molecular weight less than 80 g/mol, which are more readily separated by simple adsorption methods from the second reformate stream, as compared to separating high molecular weight sulfur compounds from liquid fuels. The reforming process of this invention provides for improved catalyst longevity when operating with a high sulfur-containing liquid fuel. An operating time of greater than about 30 hours is easily achieved at 3,000 ppm$_w$ sulfur with essentially no catalyst degradation. Preferably, an operating time of greater than about 100 hours, more preferably, greater than about 250 hours, even more preferably, greater than about 500 hours, and most preferably, greater than about 1,000 hours is achieved with essentially no significant catalyst degradation.

In a preferred embodiment of this invention, the first reformate stream and/or the second reformate stream, which exit the Stage 1: CPOX and Stage 2: ATR reactors, respectively, at a temperature in a range from about 600° C. to about 900° C., are fed into a heat exchanger to reduce the temperature of the respective reformate stream to a range from about 250° C. to 800° C. Generally, temperature reduction is desirable if the stream is to be fed into a sulfur adsorbent bed. The heat exchanger can be any conventional apparatus for exchanging heat between a hotter fluid stream and a colder fluid stream. In this instance, the heat from the first or second reformate stream is transferred to a stream of liquid water, thereby assisting in the production of steam or in superheating steam, which is advantageously provided to the Stage 2: ATR reactor.

After the temperature of the first and/or second reformate stream is reduced, the stream may be contacted with one or a plurality of sulfur adsorbent bed(s) to remove essentially all of the low molecular weight sulfur compounds present in the stream. It should be mentioned that current sulfur adsorbent beds cannot efficiently remove high molecular weight organosulfur compounds native to the liquid fuel feedstock. Accordingly, the process of this invention provides the advantage of converting native organosulfur compounds to non-native sulfur compounds more readily adsorbed and removed from the stream. The sulfur adsorbent beds may be disposable, non-disposable or regenerable; and they may be linked sequentially, or in a temperature and/or pressure swing construction, or in a thermally-linked design, as known in the art. The sulfur adsorbent comprises any material capable of adsorbing low molecular weight sulfur compounds like hydrogen sulfide, carbonyl sulfide, dimethyl sulfide, and ethyl methyl sulfide, preferably, hydrogen sulfide and carbonyl sulfide. Suitable non-limiting examples of sulfur adsorbents include zinc oxide, copper and chromium impregnated activated carbon, various molecular sieves (zeolites), for instance, zeolites X, Y, faujasite, ZSM-5, comprising crystalline aluminosilicate polymers having a three-dimensional interconnecting lattice or network of silica and alumina tetrahedra, as well as sorbent-coated substrates, such as sorbent-coated metallic meshes, foams, and zeolites. Preferably, the sulfur adsorbent comprises a bed of zinc oxide. The temperature, pressure, and flow rate employed in the desulfurizer adsorption stage(s) are conventional, as described for example in U.S. Pat. No. 5,248,489 and US 2008/0267848A1, incorporated herein by reference.

The partially-desulfurized first reformate stream exiting the first adsorbent bed preferably comprises partially-converted hydrocarbons, unconverted hydrocarbons, and any unconverted high molecular weight organosulfur compounds, but absent the low molecular weight sulfur compounds. The partially-desulfurized first reformate stream may be passed through a heat exchanger to raise its temperature and then fed into the second reforming zone (ATR). The stream exiting the second reforming zone is again passed through a heat exchanger to reduce its temperature and then fed into a second sulfur adsorbent bed. The desulfurized second reformate stream exiting the sulfur adsorbent bed(s) comprises carbon monoxide and hydrogen and is essentially free of sulfur, the latter meaning that the concentration of sulfur in the desulfurized second reformate stream is advantageously less than about 10 ppm$_v$, preferably less than about 5 ppm$_v$, and more preferably, less than about 1 ppm$_v$. This low concentration of sulfur renders the desulfurized second reformate stream suitable for use in a fuel cell stack.

In another preferred embodiment, the desulfurized second reformate stream is fed into a heat exchanger, this time to increase the temperature of the stream for use in a fuel cell stack. The heat can be derived from any heat source, such as steam or an exothermic process, such as, combustion of fuel. The temperature to which the desulfurized second reformate stream is raised depends upon the type of fuel cell stack employed. Preferred are solid oxide fuel cell stacks (SOFC), which are somewhat more tolerant to sulfur and carbon monoxide, as compared with polymer electrolyte membrane (PEM) fuel cell stacks. Alternatively, the second reformate exiting the sulfur trap can be sent to a water-gas shift (WGS) reactor, which operates at or near the same temperature as the sulfur trap. The reformate exiting the WGS reactor can be subsequently fed to a HT-PEM or with more cleanup to a LT-PEM stack.

EMBODIMENTS

In the examples that follow, the following terms are used.

"Hydrocarbon Conversion," calculated on a mole basis, refers to the percentage of hydrocarbon fuel reformed into products exiting the Stage 2: ATR zone relative to the total hydrocarbon fuel fed into the Stage 1: CPOX zone.

"Reforming or Thermal Efficiency" is calculated as follows:

$$[(M_{H2} \times LHV_{H2}) + (M_{CO} \times LHV_{CO})] \div (M_{fuel} \times LHV_{fuel})$$

wherein $M_{H2}$=moles of hydrogen in second reformate exiting Stage 2: ATR zone
  $LHV_{H2}$=lower heating value of hydrogen
  $M_{CO}$=moles of carbon monoxide in second reformate exiting Stage 2: ATR zone
  $LHV_{CO}$=lower heating value of carbon monoxide
  $M_{fuel}$=moles of fuel fed to Stage 1: CPOX zone
  $LHV_{fuel}$=lower heating value of fuel fed to Stage 1: CPOX zone "$H_2$+CO Concentration" is calculated as the combined mole percentage of hydrogen and carbon monoxide taken relative to total moles of gaseous components (dry basis) in the second reformate stream.

EXAMPLE 1

A two-stage reforming apparatus in accordance with the invention was constructed and operated as follows. With reference to FIG. 1, JP-8 fuel containing 3,000 ppm$_w$ sulfur, primarily in the form of thiophenes, was fed via inlet line 2 into a first reforming zone 1 (Stage 1: CPOX). A feed 3 of air was also fed into the first reforming zone 1. The mixture of fuel and air in zone 1 was contacted with a partial oxidation catalyst comprising a Microlith® ultra-short-channel-length metal mesh substrate having rhodium metal deposited thereon, the catalyst obtained from Precision Combustion, Inc., North Haven, Conn., USA. The contacting was conducted under reaction conditions sufficient to produce a first reformate stream comprising unconverted and partially-converted hydrocarbons, carbon monoxide, hydrogen, hydrogen sulfide, and carbonyl sulfide exiting reforming zone 1 via outlet line 4. The first reformate stream was fed directly via outlet line 4 into a second reforming zone 5 (Stage 2: ATR). Air was fed via inlet line 6 into second reforming zone 5, along with a feed of steam via inlet line 7. The combined mixture of first reformate stream, air, and steam was contacted under autothermal reforming conditions with an autothermal reforming catalyst, provided by Precision Combustion, Inc. of North Haven, Conn., and comprising a Microlith® brand ultra-short-channel-length metal mesh substrate having deposited thereon rhodium metal, the contacting sufficient to produce a second reformate stream comprising essentially carbon monoxide, hydrogen, carbon dioxide, and low molecular weight sulfur compounds, specifically hydrogen sulfide and carbonyl sulfide, which exited zone 5 via outlet line 8. The second reformate stream was analyzed by conventional gas chromatography to determine the conversion of hydrocarbons and the concentration of high molecular weight organosulfur compounds. Nitrogen was used as an internal standard to perform a mass balance calculation, to determine fuel conversion and to close carbon balance as well as sulfur balance.

Operating conditions were maintained in the following ranges over the 35 hour test: Stage 1: CPOX, O/C=0.75/1-0.85/1; 980-1000° C., 14.7 psia (101 kPa), 25,000-36,000 h$^{-1}$; Stage 2: ATR, O/C=0.55-0.75, St/C=0.75-1.4; 950-970° C., 14.7 psia (101 kPa), 40,000-50,000 hr$^{-1}$.

Figure 2:
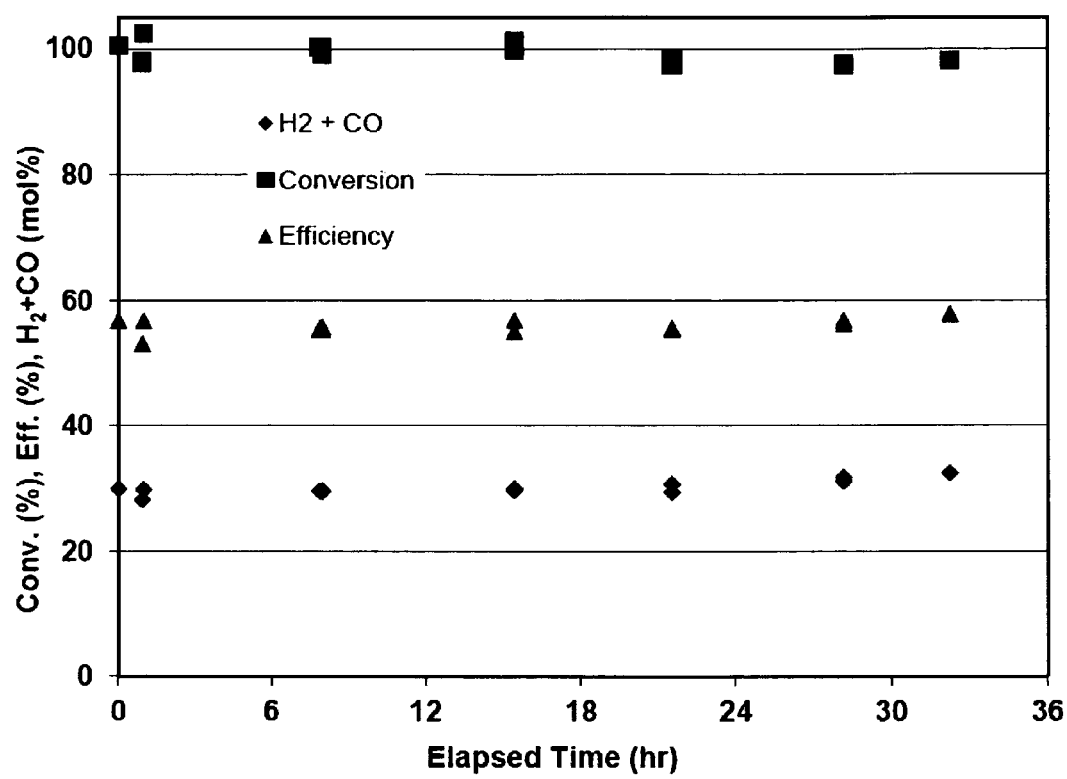
FIG. 2 depicts a graph of hydrocarbon conversion, reforming efficiency, and total $H_2$ and CO mole percent in the second reformate stream as a function of run time for an embodiment of the process of this invention, wherein JP-8 fuel containing 3,000 $ppm_w$ sulfur was reformed.

Analysis of the second reformate stream is shown in FIG. 2, which provides a plot of fuel conversion, reforming efficiency (lower heating value-based), and H$_2$+CO concentration (mole %, dry basis) as a function of time-on-stream (35-hr). The results indicate stable operation during a 35-hr test with complete fuel conversion (~100 percent) and about 55 percent reforming efficiency. The coke precursors, specifically, C2 (i.e., ethane and ethylene) and C3 (i.e., propane and propylene), were measured at less than 1,000 ppm$_v$ and 50 ppm$_v$, respectively. The above experimental data were obtained when operating the system at a high overall O/C ratio (~1.5/1, calculated as total moles of oxygen in zones 1 and 2 relative to moles of carbon in the liquid fuel feed) thereby resulting in somewhat low thermal efficiency, due to the large amount of oxygen, which leads to oxidation of hydrogen to water and of carbon monoxide to carbon dioxide. Notably, no thiophenes were detected in the second reformate, while only hydrogen sulfide and carbonyl sulfide were detectable with essentially complete sulfur balance.

EXAMPLE 2

This example illustrates the effect of varying concentration of a low molecular weight sulfur compound, specifically hydrogen sulfide (H$_2$S), in a reformate feed to the Stage 2: ATR zone illustrative of the second step of this invention. H$_2$S is produced by reforming high molecular weight organosulfur compounds, such as thiophenes, in the Stage 1: CPOX zone of this invention.

The Stage 2: ATR zone comprised a reforming zone housing a Microlith® brand ultra-short-channel-length catalyst substrate having rhodium deposited thereon (provided by Precision Combustion, Inc.), an inlet comprising a nozzle for atomizing a fuel into the reforming zone, an inlet for feeding a mixture of air and H$_2$S into the reforming zone, an inlet for feeding steam into the reforming zone, and an outlet for exiting the reformate. The ATR zone was used in a stand-alone configuration without the Stage 1: CPOX zone. JP-5 fuel having a sulfur content of 1.6 ppm$_w$ was fed through an inlet passage and atomized into the reforming zone. A mixture of H$_2$S (1000 ppm$_v$) in nitrogen was blended in an appropriate ratio with air in order to obtain a target H$_2$S concentration, which was fed into the reforming zone. Feeding H$_2$S simulates the output of Stage 1: CPOX reforming of high molecular weight organosulfur compounds. The reforming process was operated initially with no added H$_2$S, and then sequentially operated at increasing concentrations of H$_2$S of 50, 100, 150, and 200 ppm$_v$, and then again run with no added H$_2$S. The reforming zone was operated at 5.0 kW$_{th}$ at a steam-to-carbon ratio of 0.9/1. The O/C ratio was maintained close to 1.0, as adjusted to maintain a peak temperature of 970° C. Pressure was 14.7 psia (101 kPa). Less than about 100 ppm$_v$ of coke precursors (C2+C3) were observed during the test.

Figure 3:
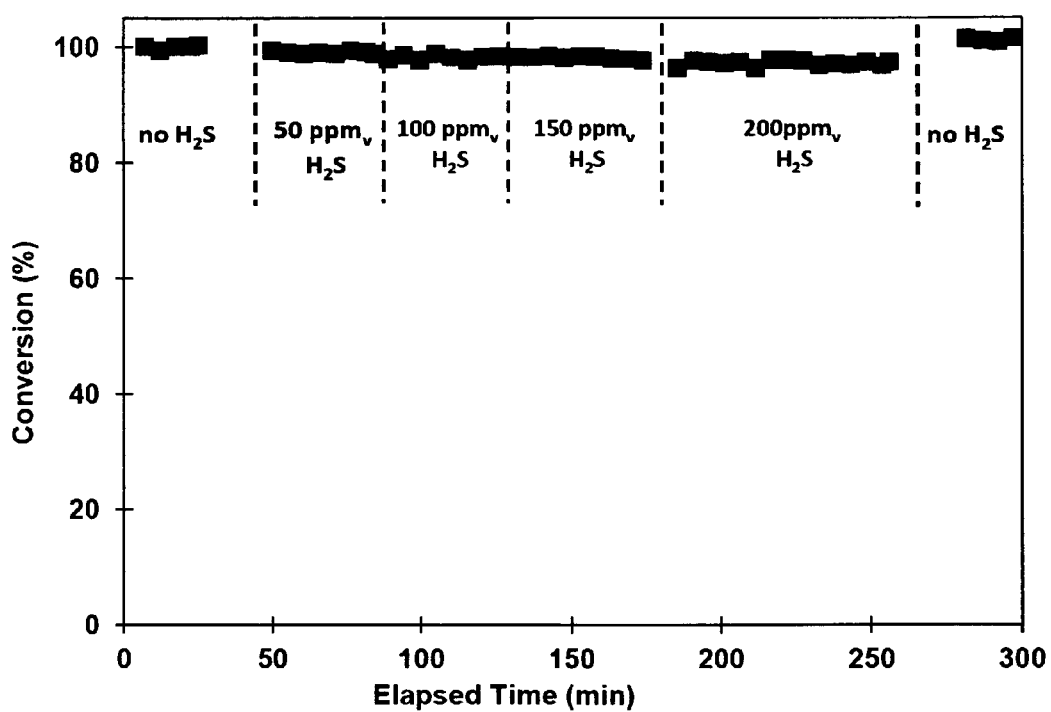
FIG. 3 depicts a graph of hydrocarbon conversion versus elapsed time in an embodiment of the Stage 2: ATR step of this invention, wherein a liquid fuel containing various levels up to 200 $ppm_v$ of added hydrogen sulfide was employed.

As shown in FIG. 3, close to 100 percent fuel conversion was achieved with up to 200 ppm$_v$ H$_2$S in the fuel feed out to 260 minutes test time. This example illustrates excellent Stage 2: ATR tolerance for up to 200 ppm$_v$ low molecular weight sulfur compound.

Comparative Experiment 1

Figure 4:
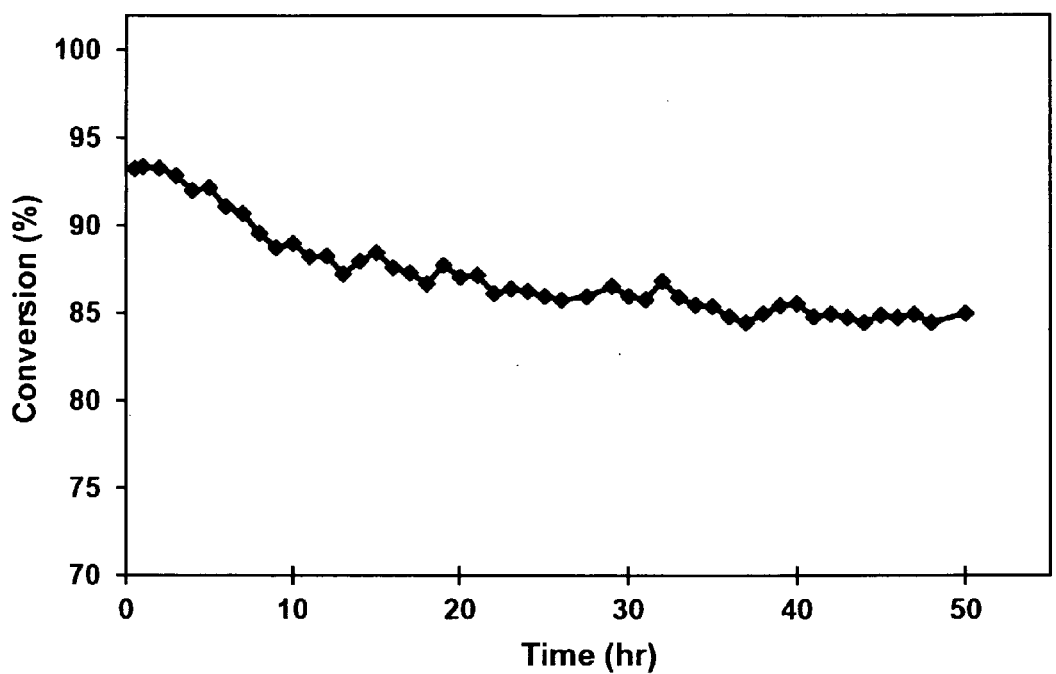
FIG. 4 depicts a graph of hydrocarbon conversion versus elapsed time for a comparative ATR reforming process using a liquid fuel doped with dibenzothiophene, the process performed in the absence of a Stage 1: CPOX reformer.

A comparative experiment was conducted to demonstrate the performance of the Stage 2: ATR process step when using a high-sulfur content liquid fuel in absence of the Stage 1: CPOX process step. JP-8 fuel was doped with a high molecular weight organosulfur compound, specifically dibenzothiophene, at a sulfur concentration of 2,000 ppm$_w$, which is approximately equivalent to 200 ppm$_v$ of H$_2$S in the reformate stream. The Stage 2: ATR zone was constructed identically to the apparatus of Example 2 hereinabove. The liquid fuel was atomized into the ATR zone with co-feeds of air and steam. The process was operated at 14.7 psia (101 kPa) for 50 hours at an O/C ratio of 1.0/1 and a St/C ratio of 0.90/1. A peak temperature was maintained between 950° C. and 970° C. with the results shown in FIG. 4.

It was found that the fuel conversion of hydrocarbons to C1 products, primarily carbon monoxide, initially started at 93 mole percent, rapidly decreased to 91 percent at 4 hours, then 87 percent at 10 hours, and continued to decrease to 85 percent at 50 hours test time. The C2 and C3 coke precursors were measured at 11,900 ppm$_v$ and 2,200 ppm$_v$, respectively, at the end of the test. It can be concluded that the high molecular weight organosulfur compounds present in the liquid fuel detrimentally affect the conversion of liquid hydrocarbons under autothermal reforming conditions. Moreover, an unacceptable quantity of coke precursors is produced.

When Comparative Experiment 1 is compared with Example 2, it can be concluded that when high molecular weight organosulfur compounds, such as thiophenes, are converted in a Stage 1: CPOX zone to low molecular weight sulfur compounds, such as hydrogen sulfide, prior to Stage 2: ATR as in the process of the invention, then fuel conversion to C1 products and hydrogen is significantly improved and production of coke precursors is significantly reduced.

EXAMPLE 3

A reforming process illustrative of the invention was run in an apparatus similar to that described in Example 1 and FIG. 1. A JP-8 fuel containing 1,000 ppm$_w$ sulfur primarily in the form of dibenzothiophenes was fed to the apparatus instead of a JP-8 fuel containing 3,000 ppm$_w$ sulfur; and the following operating conditions were maintained: Stage 1: CPOX, O/C=0.75-1.15, 850-975° C., 14.7 psia (101 kPa), 235,000-360,000 hr$^{-1}$; Stage 2: ATR, O/C=0.3-0.6, St/C=0.9-1.2; 950-985° C., 14.7 psia (101 kPa), 40,000-50,000 hr$^{-1}$. The test was run for 1,000 hr.

Figure 5:
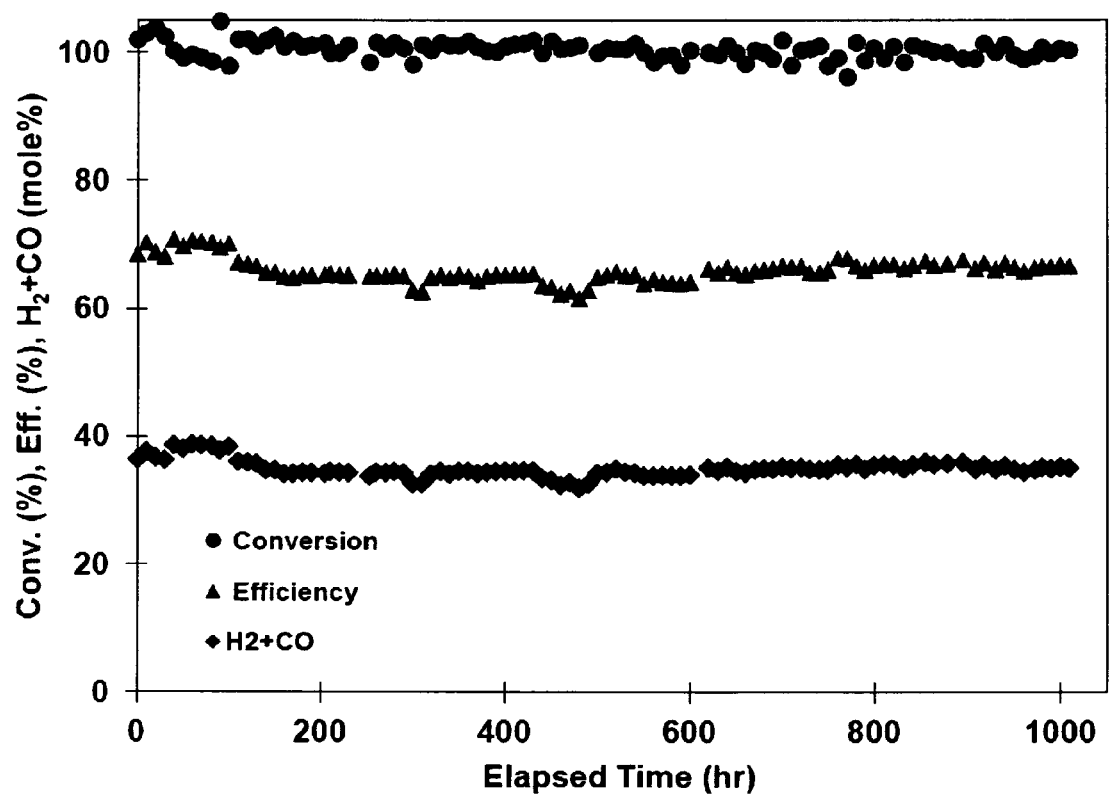
FIG. 5 depicts a graph of hydrocarbon conversion, reforming efficiency, and total $H_2$ and CO mole percent in the second reformate stream as a function of run time for an embodiment of the process of this invention, wherein JP-8 fuel containing 1,000 $ppm_w$ sulfur was reformed.

Analysis of the second reformate stream is shown in FIG. 5, which provides a plot of fuel conversion, reforming efficiency, and H$_2$+CO concentration as a function of time-on-stream (1000-hr). The results indicated stable operation during the 1000-hr test with complete fuel conversion (~100 percent) and 65 percent reforming efficiency. Essentially no loss of catalytic activity was observed over the 1000-hr test while reforming JP-8 fuel containing 1,000 ppm$_w$ sulfur. The coke precursors C2's (i.e., ethane and ethylene) were measured at less than 150 ppm$_v$ at the end of the 1000-hr test. Other coke precursors, e.g. C3's (i.e., propane and propylene) were not detected. Sulfur analysis of the second reformate stream was completed at intermittent time intervals during the 1000-hour test using a GC equipped with a calibrated flame photometric detector (GC/FPD). Near complete sulfur balance was observed which implied that all of the fuel-bound high molecular weight organosulfur compounds were converted to the gaseous low molecular weight sulfur compounds, specifically H$_2$S and COS, upon reforming in the two-stage reactor.

EXAMPLE 4

A reforming process illustrative of the invention was run in the apparatus described in Example 1 and FIG. 1. A JP-8 fuel containing 3,000 ppm$_w$ sulfur primarily in the form of dibenzothiophenes was fed into the reactor system. Operating conditions were maintained as follows: Stage 1: CPOX, O/C=1.15, 950-1000° C., 14.7 psia (101 kPa), 360,000 hr$^{-1}$; Stage 2: ATR, O/C=0.3-0.5, St/C=1.2-1.5; 980-1000° C., 14.7 psia (101 kPa), 45,000-60,000 hr$^{-1}$. The test was run for 100 hours.

Figure 6:
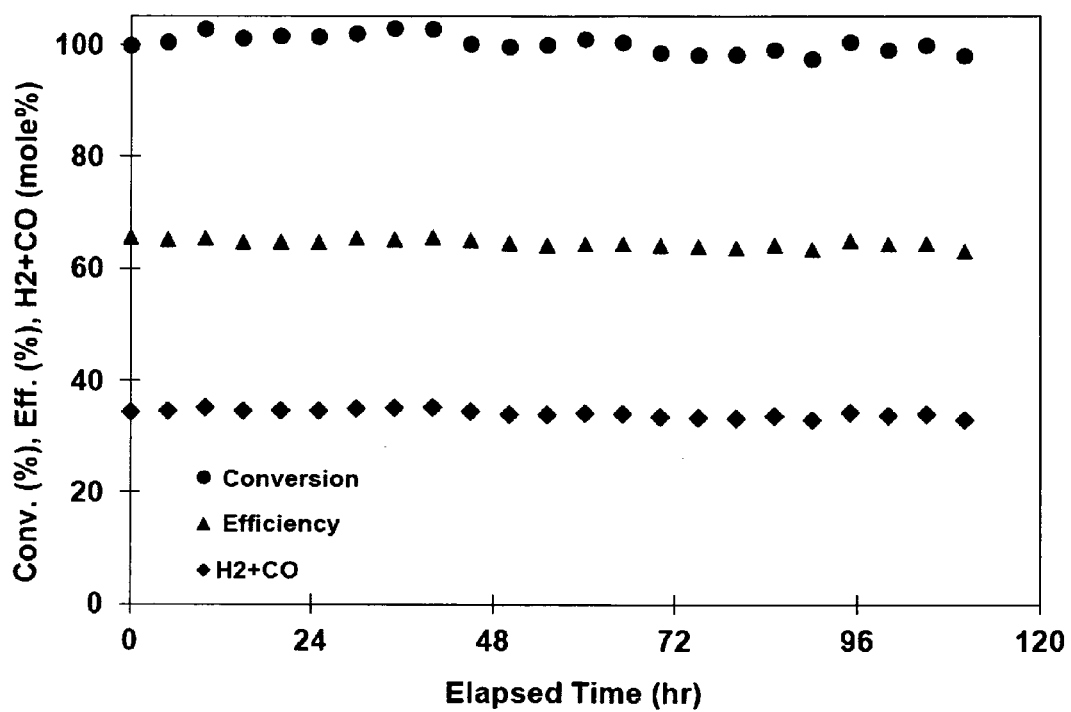
FIG. 6 depicts a graph of hydrocarbon conversion, reforming efficiency, and total $H_2$ and CO mole percent in the second reformate stream as a function of run time for an embodiment of the process of this invention, wherein JP-8 fuel containing 3,000 $ppm_w$ sulfur was reformed.

The second reformate stream exiting the ATR reactor was analyzed by conventional gas chromatography to determine the conversion of hydrocarbons and high molecular weight organosulfur compounds. Analysis of the second reformate stream is shown in FIG. 6, which provides a plot of fuel conversion, reforming efficiency, and H$_2$+CO concentration as a function of time-on-stream (100-hr). The results indicate stable operation during the 100-hr test with essentially complete fuel conversion (~100 percent) and 64 percent reforming efficiency. The coke precursors C2's were measured at less than 500 ppm$_v$ at the end of the 100-hr test. Other coke precursors, e.g. C3's, were not identified in the second reformate stream. Sulfur analysis of the second reformate strum was also completed at different time intervals during the 100 hr test using a GC equipped with a calibrated flame photometric detector (GC/FPD). Near complete sulfur balance was observed which implied that all of the fuel-bound high molecular weight organosulfur compounds were converted to gaseous low molecular weight sulfur compounds, namely H$_2$S and COS, upon reforming in the two-stage reactor.

Advantageously, the present invention eliminates the need for a fuel desulfurization system upstream of the reforming reactor, such as, a sulfur-adsorbent guard bed upstream of the reforming reactor or catalyst zone. Avoidance of an upstream desulfurization system beneficially reduces system volume, complexity, and cost. More advantageously, the invention provides for improved sulfur tolerance during fuel reforming and provides for essentially stable and complete fuel conversion, low coke precursor formation, and good response characteristics over a sustained time frame. The reforming catalyst exhibits improved longevity and process efficiency is enhanced. As another advantage, removal of low molecular weight gaseous sulfur compounds, such as H$_2$S and COS, from the gaseous reformate is much more readily accomplished, as compared with trying to remove high molecular weight organosulfur compounds from the liquid fuel.

While the present invention has been described in considerable detail hereinabove, other configurations exhibiting the characteristics taught herein are contemplated for the reforming process and apparatus of this invention. Therefore, the spirit and scope of the invention should not be limited to the description of the preferred embodiments described herein.

The invention claimed is:

1. A process of reforming a high sulfur-containing liquid fuel comprising:
    (a) feeding a high sulfur-containing liquid fuel feedstock, comprising one or more liquid hydrocarbons and one or more high molecular weight organosulfur compounds such that the liquid fuel feedstock has a sulfur concentration greater than 100 ppm$_w$, into a first reforming zone, and contacting therein said fuel with a first oxidant in the presence of a partial oxidation catalyst under partial oxidation reaction conditions sufficient to obtain a first reformate stream comprising a mixture of unconverted hydrocarbons, partially-converted hydrocarbons, and one or more low molecular weight sulfur compounds; further wherein no steam or water is co-fed into the first reforming zone; and
    (b) feeding the first reformate stream from step (a) into a second reforming zone, and contacting therein said first reformate stream with steam and a second oxidant in the presence of an autothermal reforming catalyst under autothermal reforming reaction conditions sufficient to obtain a second reformate stream comprising carbon monoxide, hydrogen, and one or more low molecular weight sulfur compounds.

2. The process of claim 1 wherein the liquid fuel feedstock comprises sulfur in a concentration greater than 100 ppm$_w$ and less than 3,500 ppm$_w$.

3. The process of claim 2 wherein the liquid fuel feedstock is selected from the group consisting of kerosene, diesel, jet propulsion fuels, and biofuels; and wherein the first and second oxidants are each independently selected from air, essentially pure oxygen, oxygen-enriched nitrogen, and oxygen-enriched inert gases.

4. The process of claim 1 wherein the one or more high molecular weight organosulfur compounds each have a molecular weight equal to or greater than 80 g/mol, and wherein the one or more low molecular weight sulfur compounds each have a molecular weight less than 80 g/mol.

5. The process of claim 1 wherein the partial oxidation catalyst and the autothermal reforming catalyst each independently comprise an ultra-short-channel-length metal substrate having deposited thereon one or more noble metals.

6. The process of claim 1 wherein step (a) is conducted at a temperature greater than 800° C. and less than 1,200° C. and a pressure between 14.7 psia (101 kPa) and 100 psia (690 kPa).

7. The process of claim 1 wherein step (a) is conducted at a gas hourly space velocity of combined fuel and first oxidant feeds of equal to or greater than 20,000 hr$^{-1}$ and less than 10,000,000 hr$^{-1}$.

8. The process of claim 1 wherein step (a) is conducted at a first oxidant to carbon (O/C) ratio, calculated as moles of atomic oxygen in the first oxidant to moles of carbon in the liquid fuel feedstock, ranging from 0.6/1 to 1.60/1.

9. The process of claim 1 wherein in step (a) greater than 10 mole percent of the high molecular weight organosulfur compounds is converted to low molecular weight sulfur compounds.

10. The process of claim 1 wherein step (b) is conducted at a temperature greater than 800° C. and less than 1,200° C. and a pressure between 14.7 psia (101 kPa) and 100 psia (690 kPa).

11. The process of claim 1 wherein step (b) is conducted at a gas hourly space velocity of combined first reformate, steam, and second oxidant feeds of greater than 10,000 hr$^{-1}$ and less than 250,000 hr$^{-1}$.

12. The process of claim 1 wherein step (b) is conducted at a steam to carbon mole ratio (St/C) ranging from 0.5/1 to 2.0/1; and wherein the process is conducted at a second oxidant to carbon mole ratio (O/C), calculated as moles of atomic oxygen in the second oxidant to moles of carbon in the liquid fuel feedstock, ranging from 0 to 1.6/1.

13. The process of claim 1 wherein the second reformate stream has a sulfur concentration ranging from greater than 10 ppm$_v$ to less than 350 ppm$_v$.

14. The process of claim 1 wherein the conversion of hydrocarbon compounds in the liquid fuel to C1 products, as measured in the second reformate stream, is greater than 90 mole percent.

15. The process of claim 1 wherein the total concentration of C2 and C3 compounds in the second reformate stream is less than 2,000 ppm$_v$.

16. The process of claim 1 wherein the second reformate stream is fed into a heat exchanger to reduce its temperature to between 250° C. and 800° C.

17. The process of claim 16 wherein the second reformate stream comprising one or more low molecular weight sulfur compounds is contacted with a sulfur adsorbent, so as to produce a desulfurized second reformate stream comprising carbon monoxide, hydrogen, and sulfur in a concentration less than 5 ppm$_v$.

18. A process of reforming a high sulfur-containing liquid fuel, comprising:
   a) feeding a high sulfur-containing liquid fuel feedstock, comprising one or more liquid hydrocarbons and one or more high molecular weight organosulfur compounds such that the liquid fuel feedstock has a sulfur concentration greater than 100 ppm$_w$, into a first reforming zone, and contacting therein said fuel with a first oxidant in the presence of a partial oxidation catalyst under partial oxidation reaction conditions sufficient to produce a first reformate stream comprising a mixture of partially-converted hydrocarbons, unconverted hydrocarbons, unconverted high molecular weight organosulfur compounds, and one or more low molecular weight sulfur compounds; further wherein no steam or water is co-fed into the first reforming zone;
   (b) contacting the first reformate stream from step (a) with a first sulfur adsorbent bed under conditions sufficient to produce a partially-desulfurized first reformate stream comprising a mixture of partially-converted hydrocarbons and unconverted hydrocarbons and unconverted high molecular weight organosulfur compounds;
   (c) feeding the partially-desulfurized first reformate stream from step (b) into a second reforming zone and contacting therein said partially-desulfurized first reformate stream with steam and a second oxidant in the presence of an autothermal reforming catalyst under autothermal reforming reaction conditions sufficient to produce a second reformate stream comprising carbon monoxide, hydrogen, and low molecular weight sulfur compounds; and
   (d) contacting the second reformate stream from step (c) with a second sulfur adsorbent bed under conditions sufficient to produce a desulfurized second reformate stream comprising a mixture of carbon monoxide and hydrogen and sulfur in a concentration of less than 5 ppm$_v$.

19. A process of reforming a high sulfur-containing liquid fuel comprising:
   (a) feeding a high sulfur-containing liquid fuel feedstock comprising one or more liquid hydrocarbons and one or more high molecular weight organosulfur compounds such that the liquid fuel feedstock has a sulfur concentration greater than about 100 ppm$_w$ sulfur into a first reforming zone, and contacting therein said fuel with a first oxidant in the presence of a partial oxidation catalyst under partial oxidation reaction conditions sufficient to produce a first reformate stream comprising a mixture of partially-converted hydrocarbons and unconverted hydrocarbons; further wherein no steam or water is co-fed into the first reforming zone; and
   (b) feeding the first reformate stream from step (a) into a second reforming zone and contacting therein said first reformate stream with steam and, a second oxidant in the presence of an autothermal reforming catalyst under autothermal reforming reaction conditions sufficient to produce a second reformate stream comprising carbon monoxide and hydrogen and sulfur in a concentration of greater than 10 ppm$_v$ and less than 350 ppm$_v$; the overall process operating at a hydrocarbon conversion greater than about 95 mole percent to C1 products for a time period greater than about 100 hours.

* * * * *